Feb. 14, 1939.　　　　T. V. BARNARD　　　　2,147,478
CORN-POPPING MACHINE
Filed Aug. 6, 1937　　　5 Sheets-Sheet 3
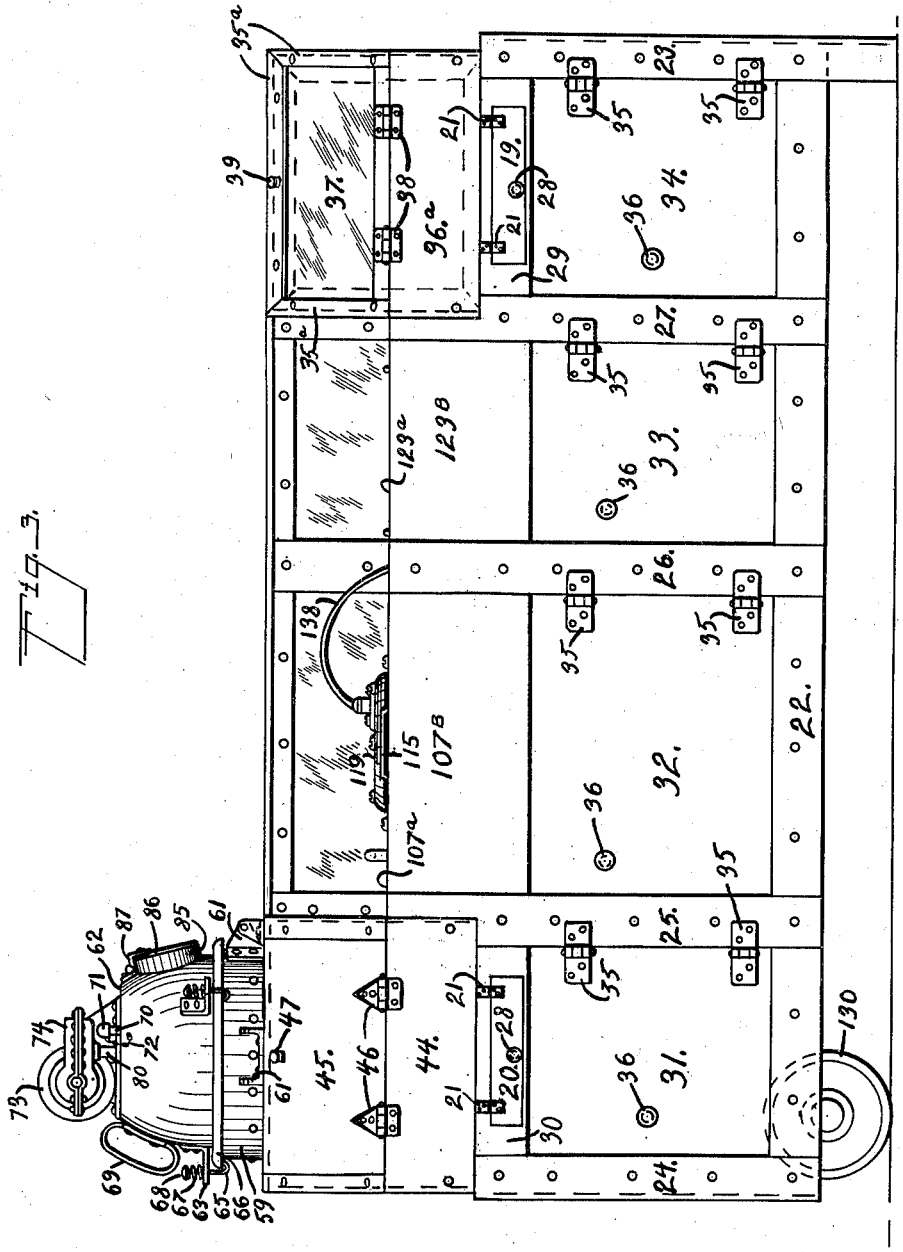
INVENTOR.
THERIDES V. BARNARD.
BY John C. Baisch
ATTORNEYS.

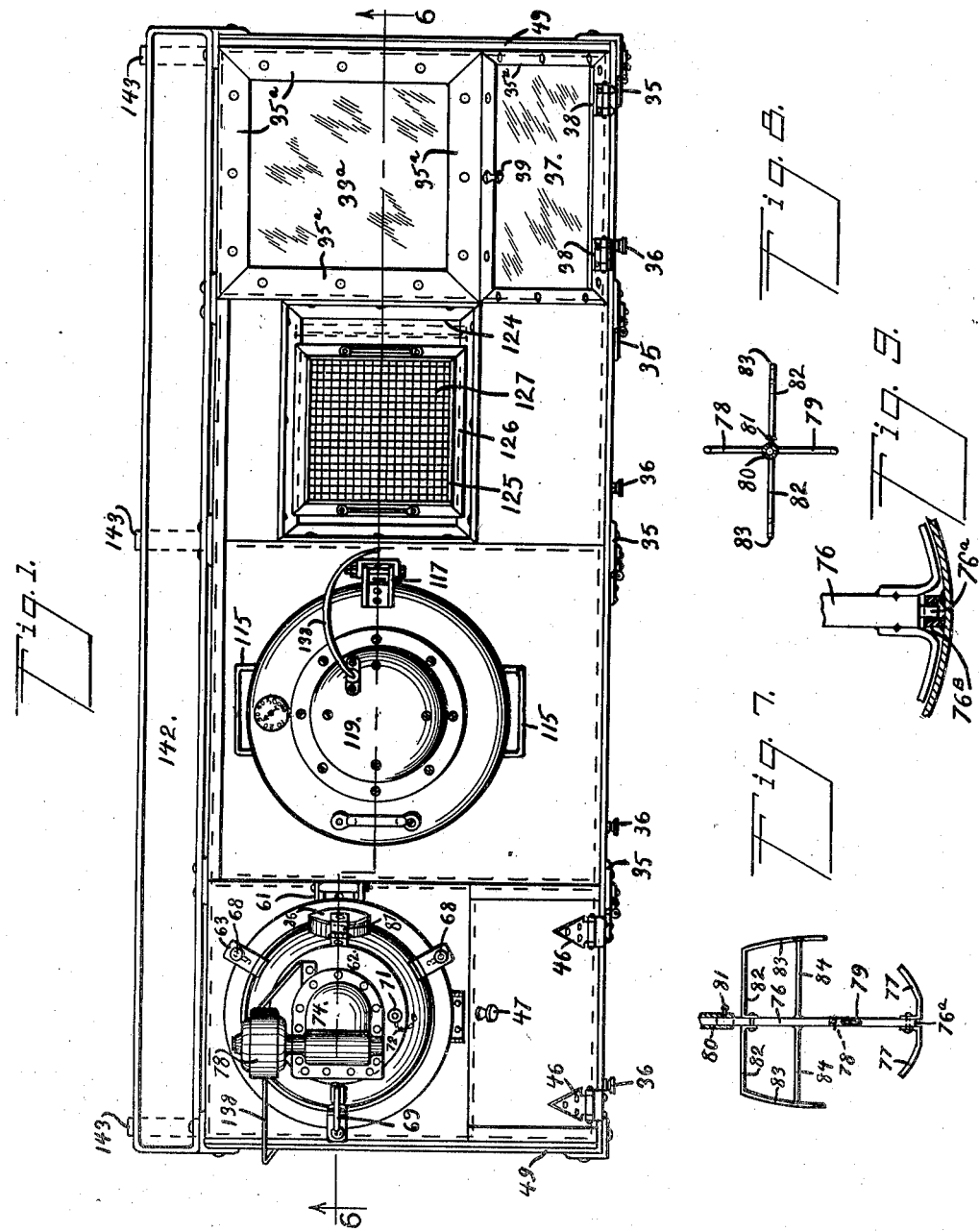

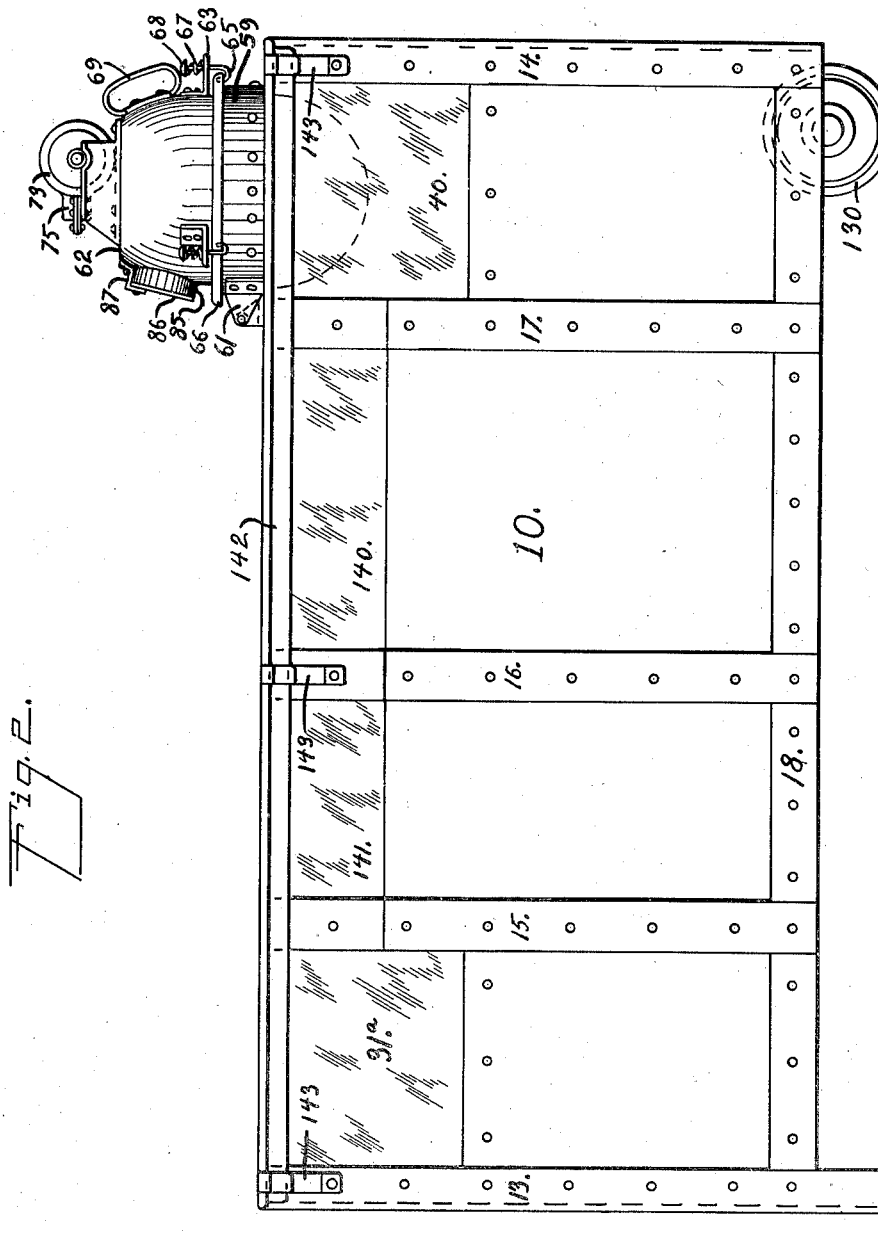

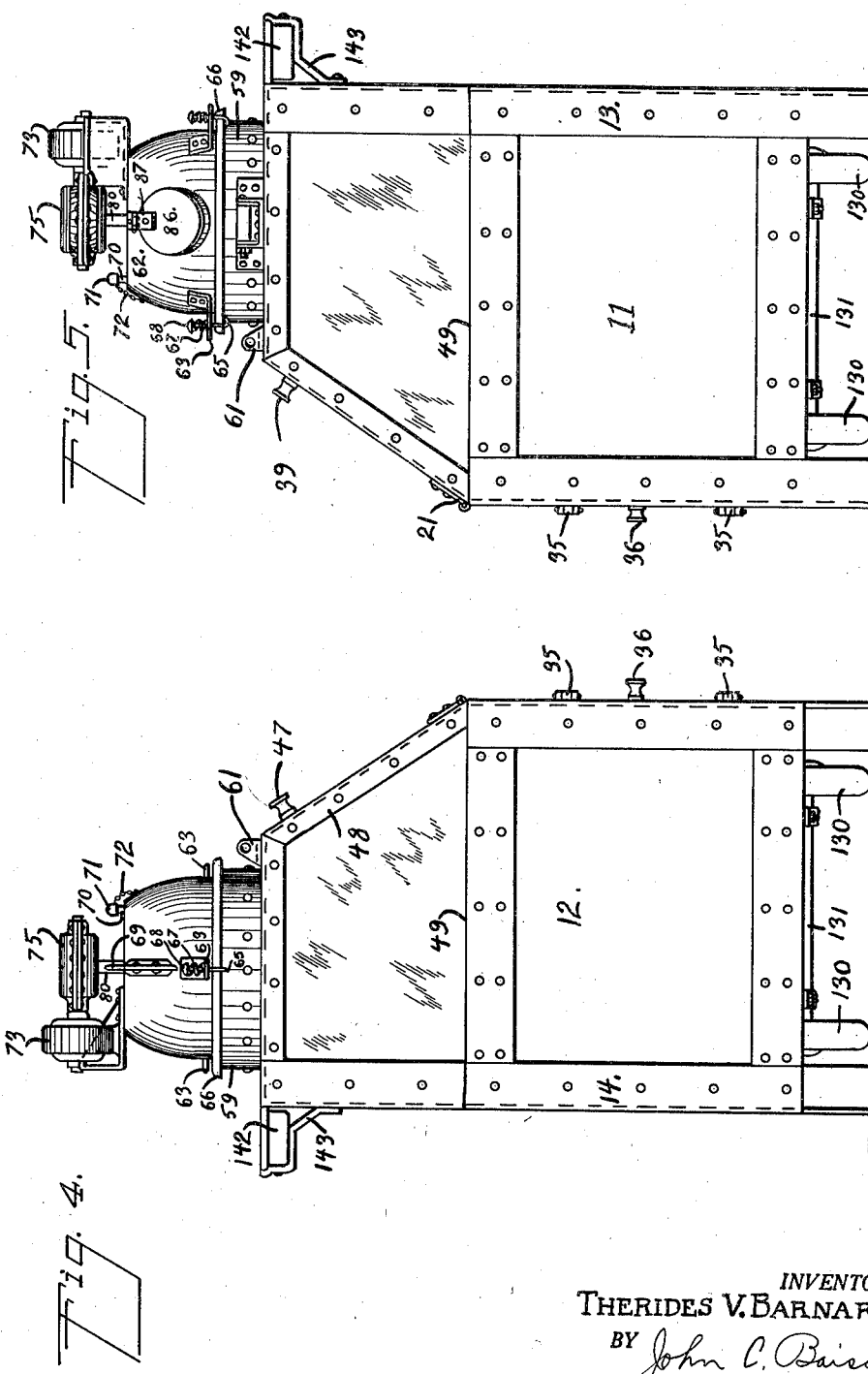

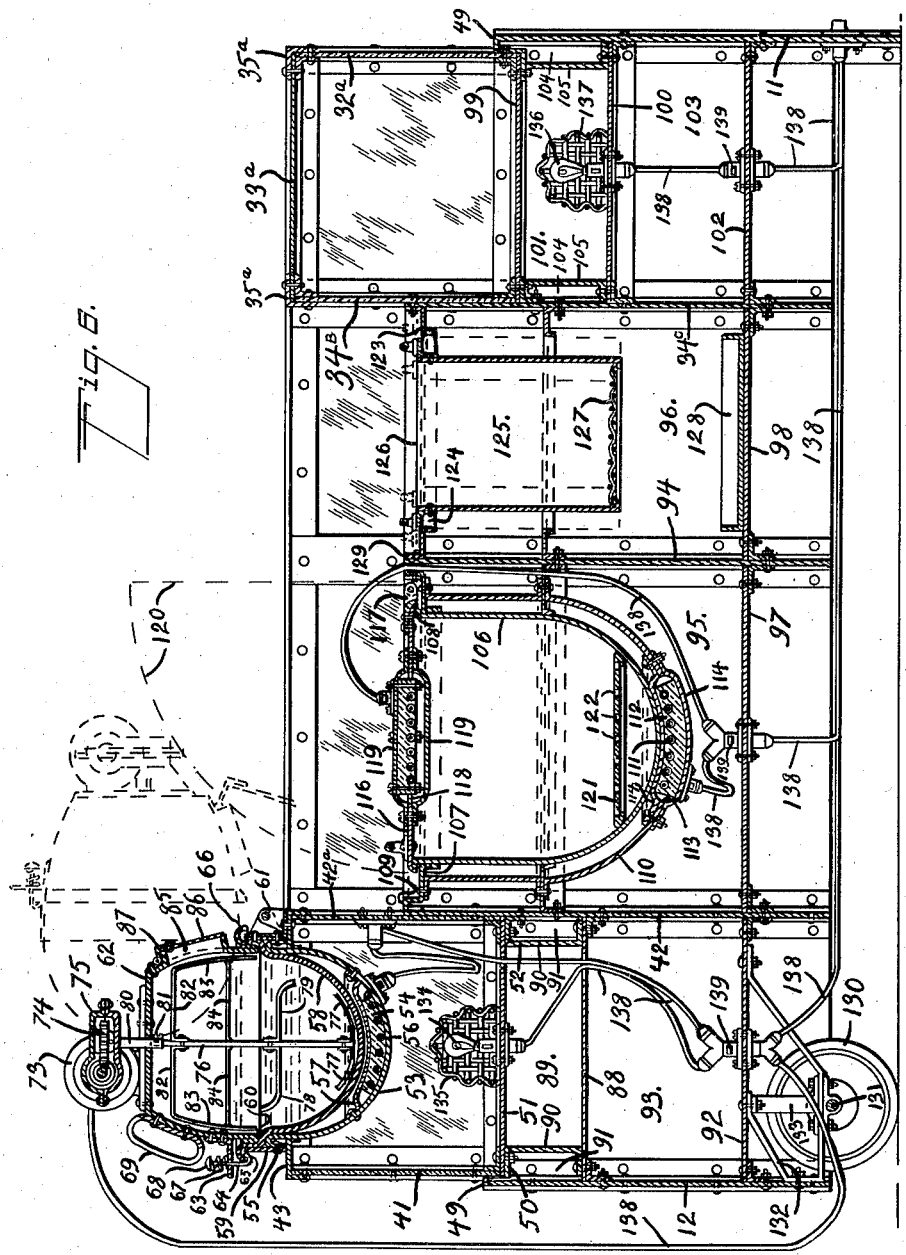

Patented Feb. 14, 1939

2,147,478

UNITED STATES PATENT OFFICE 2,147,478

CORN-POPPING MACHINE

Therides V. Barnard, Omaha, Nebr.

Application August 6, 1937, Serial No. 157,715

7 Claims. (Cl. 53—4)

My invention relates generally to corn popping machines and particularly to machines wherein pop corn and pop corn products may be completely prepared and displayed for sale.

In its preferred embodiment the invention is adapted for popping corn, sifting out unpopped kernels, cooking material to be mixed with the popped corn and mixing the popped corn therewith, keeping popped corn, and corn products, warm and displaying the finished product. The machine comprises suitable means for effecting these results.

While the invention includes the combined instrumentalities above mentioned, I wish it to be understood that I consider the aforesaid machine and means not only combinatively novel, but in so far as I am advised, certain of the devices going to make up such machine and means are new in less combinations than the whole, and some are capable of individual use, as will more clearly appear hereinafter.

With the foregoing in view it is an object of my invention to provide a machine of this character adapted to pop corn, keep same warm, cook syrupy or other material, mix the popped corn with said material, and display the popped corn or corn products in the finished state.

Further objects of my invention are: to provide a machine of this character divided into compartments having openings in the top thereof; a popping kettle tiltably received in one of said openings, said kettle having an operating motor attached to the top member thereof which is removably secured to the bottom, a removable agitating means adapted to automatically discharge popped corn from the kettle, and adjustable steam escape means for permitting escape of steam while the corn is popping; to provide a heating receptacle in another opening adjacent the kettle, said receptacle having novel handles for lifting same, heating means for heating the receptacle both from the top and bottom, and removable means adjacent the bottom of the receptacle for sifting out unpopped kernels; and to provide means in still another opening for removing unpopped kernels.

A further object is to provide a machine of this character having a warming and display compartment having certain walls thereof of transparent material.

A further object is to provide a machine of this character having a carton display rack adjacent one top edge thereof.

Another object is to provide a machine of this character that may be easily moved about and that has a finished appearance.

Still another object is to provide a machine of this character that is simple in design and construction and that is relatively inexpensive to manufacture.

Numerous other objects and advantages of the invention will be apparent as it is better understood from the following detailed description, which, taken in connection with the accompanying drawings discloses a preferred embodiment thereof.

Referring to the drawings:

Figure 1 is a plan view of my invention showing the popping kettle, the cooking receptacle, sifting means, warming compartment and display rack for cartons;

Figure 2 is a front elevation of the device which is the side presented to the public;

Figure 3 is an elevational view of the rear of the machine which is the operator's side;

Figure 4 is a left end elevation, relative to the operator's side, of the machine showing a slightly modified embodiment thereof.

Figure 5 is a right end elevation, relative to the operator's side, of the machine showing a slightly modified embodiment thereof.

Figure 6 is a vertical, longitudinal section of the machine taken on line 6—6 of Figure 1.

Figure 7 is an elevational view of the kettle agitator; and

Figure 8 is a plan view of the same.

Figure 9 is an enlarged partial section showing the lower end of the agitator shaft in operative association with its bearing.

Referring more particularly to the drawings, which illustrate a preferred embodiment of my invention, the various parts of the machine are preferably bolted together unless otherwise specified. The body of the machine comprises a front plate 10 of sheet metal which extends the full length and height of the body of the machine. The ends of the body are closed by side plates 11 and 12 respectively. An angle plate 13 secures plates 10 and 11 together and extends below the bottom of the body to provide a leg for one end thereof, said angle plate has its vertical edges slightly beveled inwardly to improve the appearance thereof. At the opposite end an angle plate 14 secures plate 10 and plate 12 together. Intermediate, vertical reinforcing strips 15, 16 and 17 are secured to the face of plate 10 and extend upwardly of the top edge thereof to the top of the machine. A horizontal reinforcing strip 18 is secured along the lower edge of plate 10.

The rear or operator's side of the body of the machine is provided with a horizontal strip 22 adjacent the bottom thereof, secured at one end to an angle plate 23 which extends downwardly of the body, similarly to angle plate 13 and is secured to end plate 11. At the opposite end strip 22 is secured to an angle plate 24 which is secured to end plate 12. Intermediate vertical strips 25, 26 and 27 respectively are provided on the operator's side. The upper end of angle plate 23 is connected to strip 27 by horizontal plate 29 and the upper end of angle plate 24 is connected with strip 25 by horizontal strip 30.

The openings formed by the various strips are closed by doors 31, 32, 33 and 34 respectively, said doors being provided with respective hinges 35 upon which they may be swung open and each door is provided with a knob 36 for opening same. Each door may be latched by any conventional latching means.

Plates 29 and 30 are each provided with an opening normally closed by respective doors 19 and 20 hinged respectively at 21 and provided with respective knobs 28. Suitable conventional latching means may be used to retain the doors in the closed position.

The body is notched laterally at each end. At one end is a display compartment extending upwardly of the body, said compartment being provided in front with a transparent wall 31a preferably of glass, an outer end wall 32a of transparent material and a top 33a, also of glass. The inner side of the compartment is closed by a glass wall 34b and below said wall 34b is a sheet metal partition 34a vertically positioned in the body. The free edges of the compartment walls are provided with strips 35a thereon by means of which the various parts are secured together. The front of the compartment is closed at the bottom by a sheet metal wall 36a to which is hinged a door 37 on hinges 38, said door being provided with an opening knob 39.

At the opposite end of the body, relative to the display compartment, is a second compartment. The body at this end is also notched laterally for reception of said compartment. The front wall 40 of the compartment is of transparent material such as glass. Side wall 41 is also of glass. The inner wall 42a is of glass and below said wall is a vertical sheet metal partition 42 in the body of the machine. A top 43 of sheet metal is suitably secured and the lower portion of the compartment at the operator's side is closed by a sheet metal wall 44. A sheet metal door 45, inclined upwardly and forwardly completes the enclosure. The door 45 is hinged at 46 to the upper edge of wall 44 and is provided with an opening knob 47. Strips 48 protect the free edges of the various walls.

The upper end compartments above described are set inwardly somewhat of the vertical planes of the respective ends and operator's side of the machine. The end wall 12 has its upper edge turned at 49 to provide a shoulder and is turned laterally inwardly at 50 to provide a flange to which the bottom 51 of the second compartment is secured. The opposite side of said bottom 51 is secured to partition 42 by means of angle iron 52.

The top 43 of the left hand upper compartment, relative to the operator's side, is provided with a large opening through which depends a support 53 for heating means 45. The upper edge 55 of support 53 is downturned with the free edge resting on the top 43. Heating means 54 comprises suitably insulated electric heating wires 56 secured in soapstone which retains heat after once being heated and the current turned off, said means being secured in place by a face plate 57 suitably secured to the support 53, said face plate being concave, as is the heating means 54 and is adapted for substantially parallel association with the bottom portion of bottom member 58 of the popping kettle. The downturned portion 55 of support 53 is provided with an annular band 59 secured thereto and to the bottom member 58 of the kettle which is provided with an annular shoulder 60 which rests on the rounded upper end of support 48 whereby said member 58 is supported slightly out of contact of plate 57. The bottom member 58 is hinged at 61 to the top 43 to permit tilting of the kettle as shown in dotted lines in Figure 6. An auxiliary hinge member 61a is secured to the top 43 adjacent the rear edge thereof to permit the kettle to be hinged thereto for emptying same in the compartment beneath the same.

Top member 62 of the kettle has an upturned free edge which rests on the inner side of shoulder 60. The top member 62 is provided with brackets 63 having holes therein adapted to receive clamps 64, said clamps being hooked at 65 adjacent their lower ends, said hooks engaging downturned free edge 66 of the bottom member of the kettle. An expansion spring 67, abutting respectively against the bracket and head 68 of the clamp holds the top and bottom members of the kettle securely together although same may be removed by releasing the clamps. Handle 69 is provided for tilting the kettle. An exhaust steam tube 70 is provided on the top member 62, said tube having a cap 71 having an opening therein of reduced size, relative to the size of the opening in the steam tube, for regulating the amount of steam allowed to escape from the kettle. Chain 72, having one end secured to the top member 62 and the other end secured to cap 71, prevents loss of the cap when same is removed from the steam tube to allow more steam to escape.

An electric motor 73 is suitably mounted to the top member 62 and is operably connected with a rotatable agitator depending in the kettle by means of suitable reduction gears 74 enclosed in housing 75.

The agitator comprises a shaft 76 having secured thereto upwardly curved laterally extending arms 77 adjacent the lower end thereof spaced about the inner side of the bottom of the kettle and substantially parallel therewith. Spaced above the arms 77 are laterally extending arms 78 and 79 secured to the shaft 76, the arm 78 being turned upwardly adjacent its free end and the arm 79 being turned downwardly adjacent its free end.

The upper end of shaft 76 is received in a sleeve 80 and secured therein by a set screw 81 and spaced below the lower end of sleeve 80 are a pair of laterally extending expelling arms 82 having downturned ends 83 with arms 84 secured to shaft 76 and the downturned ends 83 of arms 82. The lower end of shaft 76 is provided with a portion of reduced diameter 76a which is received in a bearing 76b welded to kettle bottom 58.

An obliquely flanged discharge opening 85 is provided in the top member of the kettle, said opening being normally closed by a cover 86, hinged at the top 87, through which popped corn is discharged or expelled by expelling arms 82, the cover being light enough to open when a mass of popped corn presses against same. The opening is also employed in pouring unpopped corn into the kettle. Popped corn may also be poured from the opening by tilting the kettle as shown in dotted lines in Fig. 6.

Beneath the horizontal wall 51 is a horizontal partition 88 suitably secured in the body in downwardly spaced relation to wall 51 thereby providing a compartment 89. Vertical, inwardly spaced, partitions 90 provide air spaces 91 at the sides of compartment 89. Beneath partition 88, in downwardly spaced relation thereto, is a horizontal bottom member 92 secured in the body, thereby forming a compartment 93. A vertical partition 94 is provided in the body, intermediately partitions 34 and 42, thereby providing compartments 95 and 96 in the body, said compartments being closed at the bottom by bottom walls 97 and 98 respectively.

The bottom of the display compartment is closed by a sheet metal piece 99 and beneath said piece 99, in downwardly spaced relation, is a horizontal partition 100 to complete enclosing a compartment 101. Beneath said partition 100, in downwardly spaced relation is a bottom piece 102 thereby providing another compartment identified as 103.

Compartment 101 is provided with air chambers 104 at the sides by securing therein vertical walls 105 spaced inwardly of the sides of said compartment 101.

A cooking receptacle 106 is removably received in an opening in top plate 107, secured in the machine by bolts. A bead 108 about the upper rim of the receptacle 106 supportingly engages the edge of the opening in plate 107. The plate 107 is shouldered at 109, as shown in the drawings, along the margins to enhance the appearance of the machine.

A support 110 for an electrical heating element for heating the bottom of the receptacle, encloses the body of the receptacle in spaced relation thereto. The heating element comprises electric coils 111 mounted in a soapstone base 112 and is received in an opening 113 in the bottom of the support 110, said element being enclosed by plates 114. The heating element is concavo-convex, as well as plates 114, thereby providing a concave inner surface which intimately contacts the convex bottom of the receptacle to effect efficient heating of said receptacle by the heating element. The receptacle is provided with handles 115 welded to the beaded rim thereof, and said handles extend outwardly of the receptacle at substantially a forty-five degree angle relative to the plane of the rim thereof.

A cover 116 is provided for the receptacle and is hinged at 117 to the top member 107, said cover being provided with an electrical heating element received in an opening 118 in said cover. The heating element comprises suitable electric wires mounted in soapstone, as shown, and is retained in position by top and bottom plates 119 secured to the cover. The cover swings open as indicated by dotted lines 120 in Figure 6.

Should it be desired to sift unpopped kernels from popped corn in the receptacle a sifting plate 121 of smaller diameter than the receptacle is placed adjacent the bottom thereof but spaced upwardly therefrom. The plate 121 has graduated openings 122, the larger openings being adjacent the outer edge of said plate with the smaller ones toward the center.

Top plate 107 is shouldered at 107a and is downturned at 107b to form a wall above door 32 of the operator's side of the machine.

Adjoining compartment 95 is the sifting compartment 96 having a top 123 with a rectangular opening 124 therein. Within the opening and depending in compartment 96 is a sifting box 125 having outwardly turned edges 126 forming supporting flanges which engage the edges of top 123 about the opening 124. The box 125 is rectangular and slightly narrower than the width of the opening 124 but of less length than said opening. The box may be moved longitudinally in the opening to shake unpopped kernels of corn from the popped corn that may be placed in the box. The bottom of the box comprises a screen 127 of suitable mesh to permit unpopped kernels to drop therethrough but which will retain popped corn in the box. The unpopped kernels are caught in a pan 128 on the bottom 98 of compartment 96. It should be noted that top 123 is in substantially the same horizontal plane as top plate 107 and is provided with shoulders 129 similar to those of top plate 107, said top 123 is also shouldered at 123a and downturned at 123b to provide a wall above door ee of the operator's side of the machine.

The kettle end of the device is supported on wheels 130 operably mounted on an axle 131 secured to the body of the machine by brackets 132 and 133, the ends of brackets 132 being secured to the bottom member 92.

The compartment in which the kettle depends is provided with a warming light 134 protected by a woven wire cover 135 and compartment 101 has a warming light 136 protected by a woven wire cover 137. The lights and the heating elements are supplied with electric current through the respective electric wires 138. Switches 139 are interposed in the respective circuits to control the heating element for the kettle, the warming light 134, the heating elements of the receptacle, and the warming light 136 respectively.

Glass windows 140 and 141 are provided in the front of the machine above the top members 107 and 103 respectively.

Along the front top edge of the machine is a carton rack 142 extending the length thereof, said carton rack being in the form of a trough and supported on the body of the machine by brackets 143.

In operation of the machine corn is popped in the kettle, the corn being poured into the kettle through opening 85. As the corn pops and fills the kettle the expelling arms of the agitator, operated by the motor, expel the popped corn through opening 85. Corn, after it is popped, may be poured from the kettle into the receptacle as indicated by dotted lines in Figure 6. The popped corn may be kept warm in the kettle until boxed.

Should it be desired to coat the popped corn with some suitable material, said material may be cooked in the receptacle, the popped corn may, in this case, be sifted in box 125 and then transferred to the receptacle and mixed with the cooked material. Popped corn thus prepared is displayed in bulk in the warming compartment from which compartment it may be taken for boxing in suitable cartons as needed, the cartons being placed in the display rack.

Popped corn, uncoated, may be displayed in the warming compartment if desired, and unfilled cartons may be displayed in the rack.

When it is desired to keep popped corn in the receptacle, without mixing same with suitable coating material, the sifter plate 121 is placed in position in said receptacle. When coating the popped corn, however, the sifter plate is removed.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention what I claim is:

1. In a machine of the class described, the combination, a body having longitudinally arranged compartments, said compartments being respectively, a kettle compartment, a receptacle compartment, a sifter compartment and a display compartment, a popping kettle depending in an opening in the top of the kettle compartment, a hinge on said kettle, a receptacle in the receptacle compartment adjacent the kettle compartment, said receptacle having electric heating elements for cooking material therein, said kettle being adapted to be tilted on its hinge to a position above the receptacle for discharging popped corn from the kettle into the receptacle, a sifting box operably depending in an opening in the top of the sifter compartment, said box being adapted to be shaken in said opening to shake out unpopped kernels of corn from popped corn, and warming means for warming popped corn and corn products in the display compartment.

2. In a machine of the class described, the combination, a body having longitudinally arranged compartments, a popping kettle comprising a bottom member dependingly supported in an opening in the top of one of the compartments, a hinge on said bottom member on which same may be swung over the adjacent compartment, a top on said kettle clamped to the bottom member in removable association therewith, an electrically operated agitator in said kettle comprising a vertical shaft, laterally extending arms adjacent the bottom of the kettle, laterally extending arms spaced upwardly of said first mentioned arms, one of the second mentioned arms being upturned adjacent the end thereof and the other being downturned adjacent the end thereof, expelling arms in the upper portion of the kettle, said arms extending laterally of the vertical shaft and provided with downturned portions, and laterally extending arms secured to the shaft and to the respective downturned portions of the expelling arms adjacent the free ends thereof, said kettle top having an opening therein, a cover for said opening hinged adjacent the top thereof and adapted to swing open by pressure of massed popped corn thereagainst, electrical heating means beneath the kettle for supplying heat to pop corn therein, a cooking receptacle received in an opening in the top of the compartment adjacent the kettle, electric heating means beneath the receptacle, a cover for said receptacle, electrical heating means mounted in the cover, sifting means operably mounted in the compartment adjacent the receptacle, said means comprising a sifter box having a wire mesh screen bottom adapted to permit unpopped kernels to drop therethrough and retain popped corn in the box, the top of the sifting compartment having a rectangular opening therein through which said box is dependingly supported, said opening being large enough to permit the box to be moved longitudinally of the opening for sifting the corn, the compartment adjacent the sifting box having transparent walls whereby the finished product may be displayed, and a carton rack mounted along the top front edge of the machine.

3. In a machine of the class described, a body constructed of sheet metal having a central raised portion divided into a compartment adapted to receive a cooking receptacle and a sifter compartment, the latter having an opening in the top thereof, said opening being rectangular and adapted to operably receive a sifter box, the body adjacent the receptacle being horizontally divided into a storage compartment and a heating compartment, the body adjacent the sifter compartment being also divided horizontally into a storage compartment and a warming compartment, transparent walls enclosing a kettle compartment above the first mentioned warming compartment, said compartment having a transparent door openable on hinges along the bottom portion thereof and secured to a sheet metal wall, the side walls of said compartment being beveled from the rear upwardly and forwardly with the door correspondingly inclined, transparent walls enclosing a display compartment above the second mentioned warming compartment, said compartment having a transparent door at the rear openable on hinges along the lower horizontal edge thereof and secured to a sheet metal wall, the side walls of said compartment being beveled from the rear upwardly and forwardly with the door correspondingly inclined, glass walls for the front of the body above the receptacle and sifter compartments extending upwardly to a level with the kettle and display compartments, doors at the rear of the body for each compartment to provide access thereto, wheels operably mounted at one end of the body, legs for the opposite end of the body, and a shoulder along the side and rear upper edges of the body, the kettle compartment and the display compartment being set inwardly of the sides of the body.

4. In a machine of the class described, a body constructed of sheet metal having a central raised portion divided into a compartment adapted to receive a cooking receptacle and a sifter compartment, the latter having an opening in the top thereof, said opening being rectangular and adapted to operably receive a sifter box, the body adjacent the receptacle compartment being horizontally divided into a storage compartment and a warming compartment, the body adjacent the sifter compartment being also divided horizontally into a storage and a warming compartment, transparent walls enclosing a kettle compartment above the first mentioned warming compartment, said compartment having a transparent door openable on hinges at the bottom, the side walls of said compartment being beveled from the rear upwardly and forwardly with the door correspondingly inclined, said compartment being set inwardly of the end and rear of the body, transparent walls enclosing a display compartment above the second mentioned warming compartment, said compartment having a transparent door openable on hinges at the bottom, the side walls of said compartment being beveled from the rear upwardly and forwardly with the door correspondingly inclined, said compartment being set inwardly of the adjacent end and rear side of the body, glass walls for the front of the body above the receptacle and sifter compartments extending upwardly to a level with the top of the kettle and display compartments, a door for each compartment at the rear of the machine to provide access to each of said compartments, wheels operably mounted at one end of the body, legs for the opposite end of the body, an upraised shoulder along the side and rear upper edges of the body, and a carton rack along the front top edge of the machine.

5. In a machine of the class described, corn popping means comprising a depending support having its upper free edge downturned and adapted to supportingly rest on the top wall of a kettle compartment, heating means in the bottom of the support having insulated electric heating coils operably received in a soapstone brick, the upper surface of said brick being concave, a face plate covering said heating means, the central portion of which is concavo-convex for intimate association with the brick, a kettle bottom member depending in the support and secured thereto by means of an annular band about the downturned edge of the support, said bottom member having a shoulder resting on the top of the support, a top member having its lower rim resting on the inside of the shoulder of the bottom member, brackets on the top member, clamp means for each bracket for releasable securing the top and bottom members together, said clamps engaging the free edge of the bottom member which is downturned, the top member being provided with a flanged opening, a door normally closing said opening and hinged at the top, said door being adapted to be openable by the pressure of popped corn thereagainst, an electric motor secured to the top of the top member, an agitator depending vertically in the kettle and operably connected with the motor through reduction gears, said agitator having laterally extending arms adjacent the bottom of the kettle in substantially parallel relation thereto, laterally extending arms spaced upwardly of the first mentioned arms, said last mentioned arms being oppositely curved adjacent their respective free ends, expelling arms in the upper portion of the kettle, said arms each extending laterally of the shaft and downwardly and strengthened adjacent their ends by laterally extending reinforcing arms connected at their respective ends to the shaft and the downturned portions of the expelling arms, a steam tube for the top member for the escape of steam, a cap on said steam tube having a smaller opening than said tube, said cap being removable, and a handle on the top member.

6. In a machine of the class described, a supported top having a rectangular opening therein, a sifter box of slightly less width than the width of the opening and of considerably less length than said opening, outwardly turned flanges about the upper open end of the box adapted to supportingly engage the edges of the top about the opening, said box being adapted to be moved rapidly longitudinally in the opening, and a perforated bottom in the box adapted to permit unpopped kernels of corn to drop therethrough but which will retain popped corn in the box.

7. In a machine of the class described, corn popping means comprising a depending support having its upper free edge downturned and adapted to supportingly rest on the top wall of a kettle compartment, heating means in the bottom of the support having operably arranged electric heating elements, the top of said means being concave, an annular ring secured to the downturned edge of the support, a kettle bottom member depending in the support and secured to the ring, said bottom member having a shoulder resting on the top of the support, a top member having its lower rim resting on the inside of the shoulder of the bottom member, brackets on the top member, clamp means for each bracket for releasably securing the top and bottom members together, said clamps engaging the free edge of the bottom member which is downturned, the top member being provided with an obliquely flanged opening, a door normally closing said opening and hinged at the top, said door being adapted to be openable by pressure of popped corn thereagainst, an electric motor secured to the top of the top member, an agitator depending vertically in the kettle and having its lower end of reduced diameter, a bearing welded to the bottom of the kettle in which the lower end of the agitator shaft is operably received, laterally extending arms adjacent the bottom of the kettle and in substantially parallel relation thereto, laterally extending arms spaced upwardly of the first mentioned arms, the last mentioned arms being oppositely curved adjacent their respective ends, one upwardly and one downwardly, expelling arms in the upper portion of the kettle, said arms each extending laterally of the shaft and oppositely of each other and having downturned portions, laterally extending strengthening arms having their respective ends secured to the shaft and the opposite ends secured to the respective downturned portions of the expelling arms, reduction gears operably interposed between the motor and the agitator, a steam tube for the top member for the escape of steam, and a cap on said steam tube having an opening smaller than the opening in said tube, said cap being removable from said tube.

THERIDES V. BARNARD.